(12) United States Patent
Sharan et al.

(10) Patent No.: US 11,397,832 B2
(45) Date of Patent: Jul. 26, 2022

(54) VIRTUAL DATA LAKE SYSTEM CREATED WITH BROWSER-BASED DECENTRALIZED DATA ACCESS AND ANALYSIS

(71) Applicants: Dhiraj Sharan, Brookings, SD (US); Srot Sinha, Brookings, SD (US); Andrew Maloney, Brookings, SD (US); Niraj Markandey, Brookings, SD (US); Shaswat Anand, Brookings, SD (US)

(72) Inventors: Dhiraj Sharan, Brookings, SD (US); Srot Sinha, Brookings, SD (US); Andrew Maloney, Brookings, SD (US); Niraj Markandey, Brookings, SD (US); Shaswat Anand, Brookings, SD (US)

(*) Notice: Subject to any disclaimer, the term of this patent is extended or adjusted under 35 U.S.C. 154(b) by 162 days.

(21) Appl. No.: 16/998,154

(22) Filed: Aug. 20, 2020

(65) Prior Publication Data
US 2020/0380169 A1 Dec. 3, 2020

Related U.S. Application Data

(63) Continuation-in-part of application No. 16/208,843, filed on Dec. 4, 2018, now Pat. No. 10,846,342.

(51) Int. Cl.
| | |
|---|---|
| *G06F 16/00* | (2019.01) |
| *G06F 21/62* | (2013.01) |
| *G06F 21/84* | (2013.01) |
| *G06F 21/78* | (2013.01) |
| *G06F 16/16* | (2019.01) |

(Continued)

(52) U.S. Cl.
CPC ........ *G06F 21/6254* (2013.01); *G06F 16/168* (2019.01); *G06F 16/243* (2019.01); *G06F 16/24522* (2019.01); *G06F 16/256* (2019.01); *G06F 16/283* (2019.01); *G06F 21/78* (2013.01); *G06F 21/84* (2013.01)

(58) Field of Classification Search
CPC ............... G06F 16/168; G06F 16/243; G06F 16/24522; G06F 16/252; G06F 16/256; G06F 16/283; G06F 21/6254; G06F 21/78; G06F 21/84
USPC .......................................................... 704/9
See application file for complete search history.

(56) References Cited

U.S. PATENT DOCUMENTS

| | | | | |
|---|---|---|---|---|
| 8,516,065 B2* | 8/2013 | Bhat | ...................... | H04L 51/12 709/224 |
| 8,661,456 B2* | 2/2014 | Wang | ..................... | G06F 9/547 719/318 |

(Continued)

*Primary Examiner* — Khai N. Nguyen
(74) *Attorney, Agent, or Firm* — Pharar Patents & Intellectual Property; Andrew A. Pharar

(57) ABSTRACT

A virtual data lake system created with browser-based decentralized data access and analysis is disclosed herein. As contemplated by the present disclosure, the system provides a single interface that allows a user to access and analyze multiple enterprise data storage locations remotely and simultaneously while presenting and reporting information from the multiple sources in a single, uniform display. Such a solution allows a user to analyze and cross-reference data stored in multiple locations in real time without requiring the actual data files to be displaced or combined. The system further implements interactive artificial intelligence, natural language processing, and workflow-based operations for improved user access and functionality.

20 Claims, 13 Drawing Sheets

(51) Int. Cl.
*G06F 16/2452* (2019.01)
*G06F 16/25* (2019.01)
*G06F 16/28* (2019.01)
*G06F 16/242* (2019.01)

(56) References Cited

U.S. PATENT DOCUMENTS

| | | | | |
|---|---|---|---|---|
| 9,002,964 | B2* | 4/2015 | Bhat | H04L 51/14 |
| | | | | 709/224 |
| 9,569,471 | B2* | 2/2017 | Sharan | H04L 41/022 |
| 9,853,941 | B2* | 12/2017 | Liang | H04L 63/0209 |
| 10,356,044 | B2* | 7/2019 | Liang | H04L 63/20 |
| 10,681,060 | B2* | 6/2020 | Scheidler | G06N 20/00 |
| 10,719,480 | B1* | 7/2020 | Todd | G06F 16/164 |
| 10,846,342 | B2* | 11/2020 | Sharan | G06F 16/90332 |
| 10,853,469 | B1* | 12/2020 | McNamara | G06F 3/0488 |
| 2012/0311562 | A1* | 12/2012 | Wang | H04L 67/34 |
| | | | | 717/177 |
| 2012/0311611 | A1* | 12/2012 | Wang | G06F 9/541 |
| | | | | 719/318 |
| 2013/0173718 | A1* | 7/2013 | Bhat | H04L 51/14 |
| | | | | 709/206 |
| 2013/0198168 | A1* | 8/2013 | Huang | G06F 16/24542 |
| | | | | 707/769 |
| 2013/0282847 | A1* | 10/2013 | Bhat | H04L 51/12 |
| | | | | 709/206 |
| 2014/0059683 | A1* | 2/2014 | Ashley | G06F 21/552 |
| | | | | 726/23 |
| 2014/0156711 | A1* | 6/2014 | Sharan | H04L 41/022 |
| | | | | 707/804 |
| 2014/0317737 | A1* | 10/2014 | Shin | H04L 63/1408 |
| | | | | 726/23 |
| 2015/0073955 | A1* | 3/2015 | Gilman | G06Q 30/04 |
| | | | | 705/34 |
| 2015/0381647 | A1* | 12/2015 | Huang | H04L 63/1408 |
| | | | | 726/22 |
| 2015/0381931 | A1* | 12/2015 | Uhma | G06F 3/0481 |
| | | | | 348/14.03 |
| 2016/0337388 | A1* | 11/2016 | Hu | H04L 63/1466 |
| 2016/0349932 | A1* | 12/2016 | Gorny | G06F 40/186 |
| 2017/0270432 | A1* | 9/2017 | Sachdev | H04L 41/16 |
| 2018/0062938 | A1* | 3/2018 | Garrison | H04L 41/147 |
| 2018/0124014 | A1* | 5/2018 | Liang | H04L 63/0209 |
| 2018/0287789 | A1* | 10/2018 | Sridharan | G06F 21/6281 |
| 2018/0302291 | A1* | 10/2018 | Srinivasan | G06F 9/5016 |
| 2018/0350144 | A1* | 12/2018 | Rathod | G06T 13/40 |
| 2019/0182267 | A1* | 6/2019 | Aher | G06F 11/302 |
| 2019/0220374 | A1* | 7/2019 | Wei | G06F 11/1479 |
| 2019/0334874 | A1* | 10/2019 | Frost | H04L 63/0272 |
| 2020/0127893 | A1* | 4/2020 | Hume | H04L 41/0893 |
| 2020/0174966 | A1* | 6/2020 | Szczepanik | G06F 16/13 |
| 2020/0175077 | A1* | 6/2020 | Sharan | G06Q 10/063 |
| 2020/0213336 | A1* | 7/2020 | Yu | G06F 9/54 |
| 2020/0380169 | A1* | 12/2020 | Sharan | G06F 16/243 |

\* cited by examiner

Platform Instances

Platform: AWS-Athena Instance Alias: S3_demo

Platform: AWS-GuardDuty Instance Alias: guardduty_demo

Platform: Cloudwatch Instance Alias: aws_demo

Platform: CrowdStrikeFalcon Instance Alias: crowdstrike_demo

Platform: Elasticsearch Instance Alias: elastic_demo

Platform: Jira Instance Alias: Jira

Platform: MISP Instance Alias: misp_demo

Platform: Splunk Instance Alias: splunk_demo

Instance Alias splunk_demo

Splunk Connection URL https://splunk.query.ai:8089

Splunk Username admin

Splunk Password

VIRTUAL DATA LAKE SYSTEM CREATED WITH BROWSER-BASED DECENTRALIZED DATA ACCESS AND ANALYSIS

TECHNICAL FIELD OF THE INVENTION

The present invention relates in general to information technology data management, and, more specifically, to a virtual data lake system created with browser-based decentralized data access and analysis.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Enterprise information security architecture (EISA) is the practice of applying a comprehensive and rigorous method for describing a current and/or future structure and behavior for an organization's security processes, information security systems, personnel, and organizational sub-units, so that they align with the organization's core goals and strategic direction. Although often associated strictly with information security technology, it relates more broadly to the security practice of business optimization in that it addresses business security architecture, performance management, and security process architecture as well. The primary purpose of creating an enterprise information security architecture is to ensure that business strategy and information technology (IT) security are aligned. As such, enterprise information security architecture allows traceability from the business strategy down to the underlying technology through data tracking and logging.

To monitor such architectures, enterprises employ IT security personnel to analyze such data and logs. Such security personnel are able, via the data and logs, to review and consider various parameters related to the behavior of devices, applications, and employees within the enterprise and the handling of data by such entities. Processing through such data and logs, though, may be a cumbersome and time-intensive task, especially where the enterprise comprises a large number of devices, applications, and employees, a small number of IT security personnel, or insufficiently trained IT security personnel.

Multiple security information and event management (SIEM) software platforms already exist to assist with such a security analysis, such as Splunk, ArcSight, and QRadar, which may aggregate relevant data from multiple data and log sources, identify events of interest such as deviations from normal behavior, and generate alerts to take appropriate action. Such platforms help to reduce the time burden of analyzing security data and logs and improve the efficacy of such analyses by security personnel, though, because such systems require structured search and other structured command-line inputs, the user must still be trained sufficiently to effectively direct and utilize the system. Users lacking in sufficient training are often unable to maximize the effectiveness of their analysis or maximize the potential of the software itself.

In addition, due to the ever-expanding globalization of companies and the increasing use of decentralized cloud-based data and storage, it is no longer practical to aggregate such information into a single location or platform, especially prior to performing a data analysis. No solution exists to provide a single application programming interface that allows a user to access and analyze multiple enterprise data storage locations remotely and simultaneously while presenting and reporting information from the multiple sources in a single, uniform display. Such a solution would allow a user to analyze and cross-reference data stored in multiple locations and using multiple programming languages in real time without requiring the actual data files to be displaced or combined.

Thus, there is a need in the art for a virtual data lake system created with browser-based decentralized data access and analysis that streamlines and augments the data analysis process by aggregating decentralized enterprise information. The system may further implement interactive artificial intelligence assistant, natural language processing, and workflow-based operations for improved user access and functionality. It is to these ends that the present invention has been developed.

BRIEF SUMMARY OF THE INVENTION

To minimize the limitations in the prior art, and to minimize other limitations that will be apparent upon reading and understanding the present specification, the present invention describes a virtual data lake system created with browser-based decentralized data access and analysis.

It is an objective of the present invention to provide a virtual data lake system that may be implemented on a computing device and exposed on the internet as Software as a Service (SAAS).

It is another objective of the present invention to provide a virtual data lake system that may comprise a proprietary software.

It is another objective of the present invention to provide a virtual data lake system that may comprise a central cloud hosted configuration database.

It is another objective of the present invention to provide a virtual data lake system that may comprise a cloud-based application programming interface.

It is another objective of the present invention to provide a virtual data lake system that may comprise a browser-based proprietary software.

It is another objective of the present invention to provide a virtual data lake system that may interact with existing enterprise data storage and information context platforms. Such platforms may themselves be on-premise or cloud hosted services themselves.

It is another objective of the present invention to provide a virtual data lake system that may interact with existing security information and event management software platforms.

It is another objective of the present invention to provide a virtual data lake system that may interact with existing internet search engine platforms.

It is another objective of the present invention to provide a virtual data lake system that may obfuscate any personally identifiable information (PII) when the user is interacting with the invention's cloud-based API service.

It is another objective of the present invention to provide a virtual data lake system that may comprise machine learning technology loaded and learning in the user's browser.

It is another objective of the present invention to provide a virtual data lake system that may comprise a plurality of workflows.

It is another objective of the present invention to provide a virtual data lake system that may comprise natural language processing for normalizing and interacting with the data present in the third-party platforms.

It is another objective of the present invention to provide a virtual data lake system that may comprise voice-interactivity.

It is another objective of the present invention to provide a virtual data lake system that may comprise visual-interactivity.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 8 illustrates an exemplary platform instances interface of a virtual data lake system created with browser-based decentralized data access and analysis, as contemplated by the present disclosure;

FIG. 13 illustrates a federated dashboard interface of a virtual data lake system created with browser-based decentralized data access and analysis, as contemplated by the present disclosure.

DETAILED DESCRIPTION OF THE INVENTION

Figure 1:
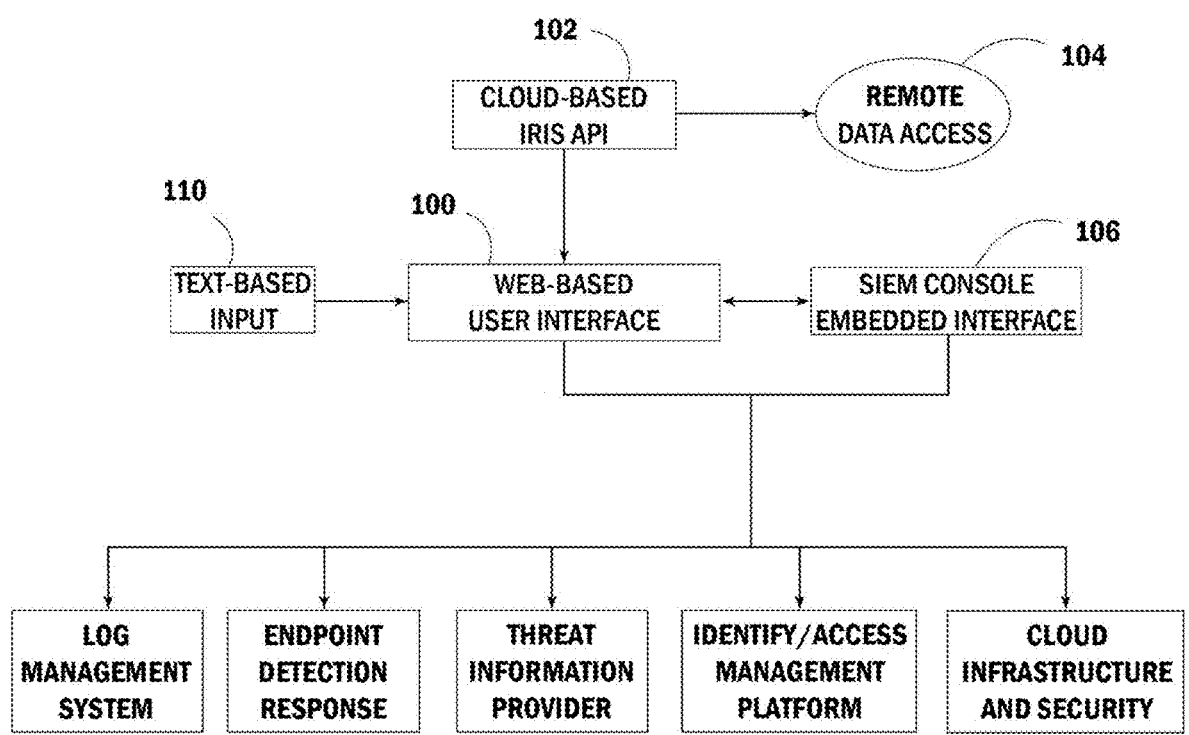
FIG. 1 schematically presents a virtual data lake system created with browser-based decentralized data access and analysis, as contemplated by the present disclosure.
Figure 2:
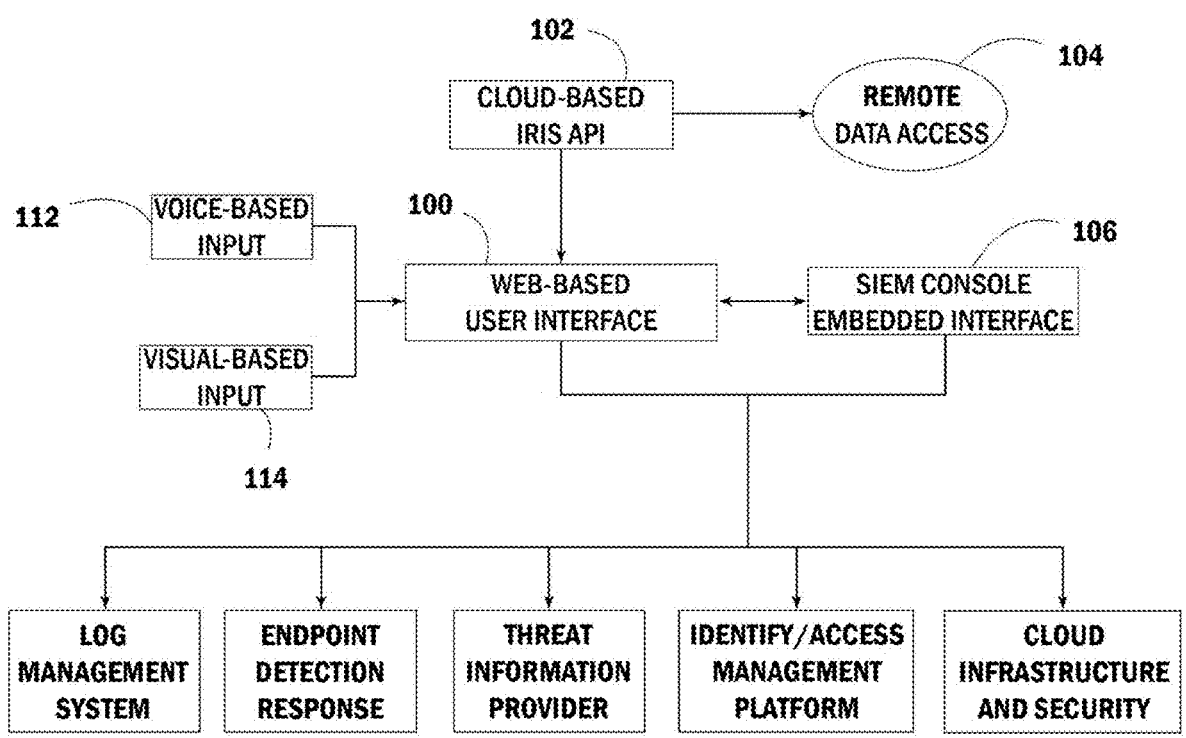
FIG. 2 schematically presents a virtual data lake system created with browser-based decentralized data access and analysis, as contemplated by the present disclosure.
Figure 3:
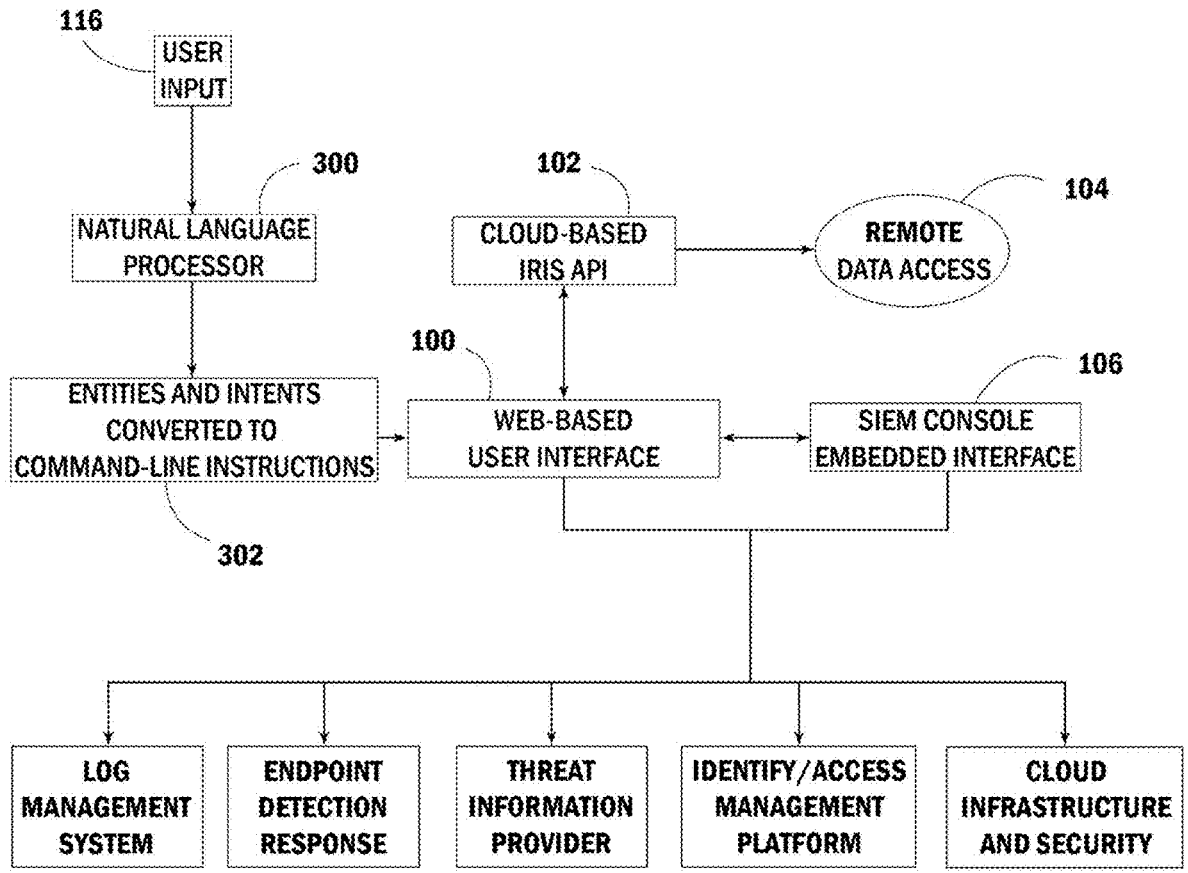
FIG. 3 schematically presents a virtual data lake system created with browser-based decentralized data access and analysis, as contemplated by the present disclosure.
Figure 4:
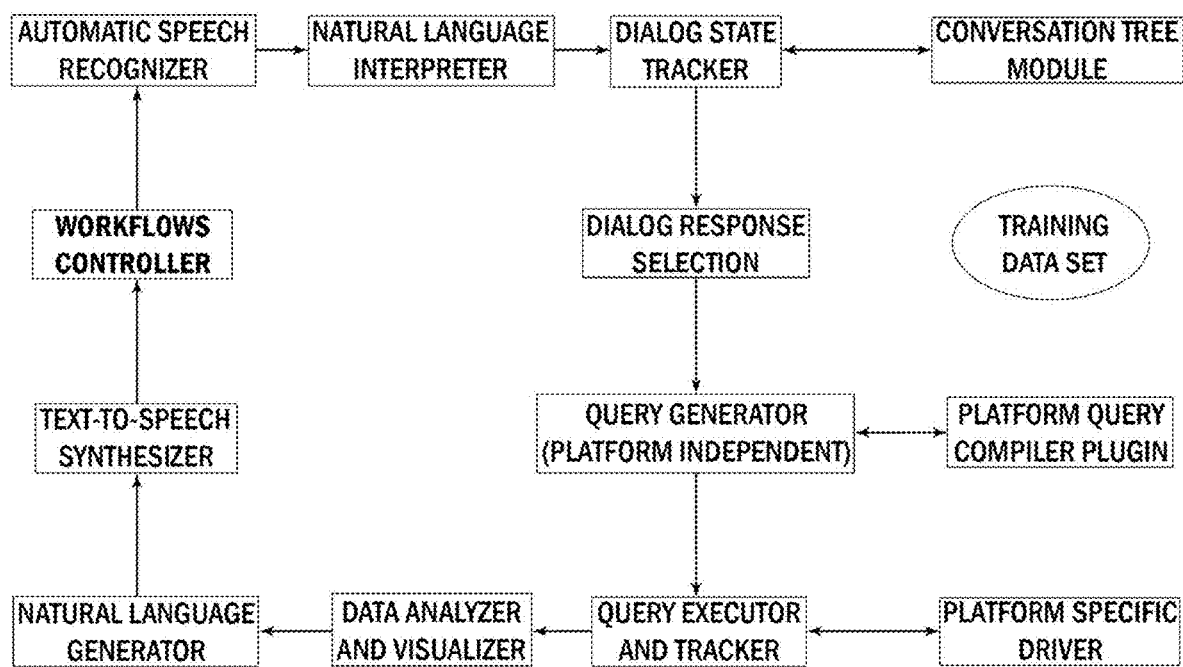
FIG. 4 schematically presents a virtual data lake system created with browser-based decentralized data access and analysis, as contemplated by the present disclosure.

Certain terminology is used in the following description for reference only and is not limiting. Unless specifically set forth herein, the terms "a," "an," and "the" are not limited to one element, but instead should be read as meaning "at least one." The terminology includes the words noted above, derivatives thereof, and words of similar import.

The present invention relates in general to information technology data management, and, more specifically, to a virtual data lake system created with browser-based decentralized data access and analysis. As contemplated by the present disclosure, the system may provide a single application programming interface that allows a user to access and analyze multiple enterprise data storage locations remotely and simultaneously while presenting and reporting information from the multiple sources in a single, uniform display. Such a solution may allow a user to analyze and cross-reference data stored in multiple locations and using multiple programming languages in real time without requiring the actual data files to be displaced or combined. The system may further implement interactive artificial intelligence assistant, natural language processing, and workflow-based operations for improved user access and functionality.

The illustrations of FIGS. 1-4 schematically present a virtual data lake system created with browser-based decentralized data access and analysis. As contemplated by the present disclosure, the virtual data lake system may comprise a web-based user interface 100 accessible by a user via the internet. The proprietary software of the system may be served as a SAAS service and may comprise a cloud-based investigations response intelligence service (IRIS) application program interface (API) 102.

One part of the present system is intended to interface seamlessly with already-existing information technology (IT) platforms. For this reason, the present system loads in a user's browser and creates and presents a virtual data lake system comprising data components served from a large number of individual third-party platforms such as, for example, Security Information and Event Management (SIEM) platforms, Log Management Systems (LMS), Endpoint Detection and Response (EDR) platforms, Threat Information Provider (TIP) platforms, Identify and Access Management (IAM) platforms, and Cloud Infrastructure and Security (CIS) platforms. It is contemplated that the virtual data lake system created with browser-based decentralized data access and analysis may function by, at a minimum, only receiving data remotely and performing its own analyses, or by utilizing analyses performed by SIEM software 108 already installed in an organization's IT network.

Once accessed, the web-based user interface 100 may be interacted with by text-based input 110, voice-based input 112, or visual-based input 114. In an embodiment comprising text-based input 110, the user may type plain English questions or platform-specific queries and commands into the user interface 100 using any appropriate input source, such as a physical or virtual keyboard or a smartphone or tablet device connected to the system, whether physically or wirelessly. In an embodiment comprising voice-based input 112 the user may interact with the system using a microphone, whether individually or integrated into a smartphone or tablet device, and the system may comprise speech recognition and language interpretation components to understand and interpret the input. In an embodiment comprising visual-based input 114 the user may interact with the system using interactive controls and clickable shortcuts in the web-based graphical user interface (GUI).

Central to the concept of the present disclosure is the application of a natural language to structured commands convertor 300, which may be based on applying existing natural language processing concepts to derive and execute commands on the third-party platforms like SIEM 108. Current natural language processors 300 work by applying lemmatization and tokenization concepts to language inputs to extract the entities and intent of the given instruction. This process involves the analyzing of input terms and the analyzing of used syntax and inflection to determine blocks of entities in the input, and then converting those entities and intents into relevant structured commands 302. Where current SIEM software 108 requires the user to input structured commands appropriate to the language of the software, the present system receives a natural language input from the user and automatically generates the appropriate command line instruction or sequence of command line instructions 302 for the chosen third-party platforms like SIEM 108.

The displaying of results via the web-based user interface 100 may be by any appropriate means. In one embodiment the web-based user interface 100 may display results as text. As an example, where the user requests information via the remote data source 104, the web-based user interface 100 may display a general summary of the information or the first few lines of text returned by the search along with a hyperlink to the source of the search results. The user's interaction with the hyperlink may then open the source of the search result in a web browser for the user to view directly.

As another example, where the user requests information via the SIEM software 108, the web-based user interface 100 may display a list of data or log references called for or otherwise matching the user's search parameters. The results of the operation executed on the source platforms like SIEM may have millions of records, but that entire big data is not transferred from that platform to the browser. Instead, the system creates a native SIEM console-like appearance providing pagination, sorting and other navigation support via subsequent commands executed inside of the STEM letting the end user jump around in the results, giving an appearance that entire data is available.

The user may also modify the displayed output, as desired, by directing the web-based user interface to return the requested results as a visual or graphical display. The innovation running in the browser examines the available fields and value distributions and other parameters to dynamically generate a set of relevant visuals called "data driven visualization". This provides the end user with easy visual analytics to understand and act based upon the data. The web-based user interface may also generate an audio output, to be played through speakers, headphones, or a smartphone or tablet connected to the system, which may read the results of a search out loud to the user or which may ask further questions of the user.

As contemplated by the present disclosure, a user input may be any inquiry, command, or other instruction appropriate for use in the IT security field. As used in the field, though, such user inputs may often follow a logical or standardized and repetitive sequence. To reduce the amount of work or skill required by the user to achieve their sought results, the virtual data lake system created with browser-based decentralized data access and analysis may further comprise a programmed sequence of inputs, which may be known as a "workflow." A user accessing the web-based user interface 100 may load a workflow that the cloud-based IRIS API 102 may then execute.

The results of each input in the sequence may be displayed, or only the final results of the workflow sequence may be displayed, as desired. The plurality of workflows may be stored on the central cloud service of the system, and new workflows may be written by users of the system for access by other users of the system. A user may further limit to whom access of workflows may be granted, limiting access, for example, only to other users within the user's network. Workflows can thus be shared with team, across partner organizations, or publicly with all users of the service. An individual workflow has built-in collaboration where users having access can edit, comment, like, dislike, upvote or downvote. New users of the service start as Level 1 user. As they mature into writing several high-quality workflows liked by others, their Level goes up to Level 9 based upon a scoring system. Thus, the system builds trust into which users are good authors of workflows.

By way of example, if a user inputs a natural language command such as "show all VPN logins," the present system receives and translates the natural language input into the SIEM-specific commands for querying VPN login data, and then displaying the results of the command inquiries. If the user inputs a natural language command such as "show me a bar graph of login failures by location," the present system receives and translates the natural language input into the SIEM-specific commands for calculating VPN login failures, returning the results of the query, and then visually displaying the results in a bar graph of login failures per remote location. The user may then further specify a time frame by inputting, for example, "show me the results for the past 30 days," and the system will apply the appropriate commands for narrowing the results of the previous inquiry. Thus, the innovation keeps track of the history of relevant questioning from the end-user so that they can be applied in aggregate.

The system allows the user to capture the interactive session consisting of a sequence of questions and follow-ups into a record known as a "workflow," and which may be automatically or manually recalled by the user for future use by the system. As contemplated by the present disclosure, the system may associate various workflows with commonly-run investigations performed on a given system, and may prioritize such workflow sequences when appropriate.

In one embodiment the system may receive an open-ended insight question, which, for example, may comprise a user commanding the system to "tell me some interesting events I should investigate today." The system, recognizing the open-ended nature of the inquiry, runs unsupervised machine learning live in the browser's JavaScript on the subset of events available within the browser, clusters them based upon similar attributes and attributes values, and presents in a UI that represents interesting aspects and commonality among the analyzed events. The system then takes feedback from the user based upon their interest and adapts future such analysis results based upon that feedback.

The system may ask clarifying questions and provide choices between close alternatives if there is not a clear match between the user's intent and the system's capability to generate and execute those instructions on the target platforms. The system may recommend the user's past choices it tracks and also additional relevant workflows from its cloud platform. The selected workflows may be run on the user's platforms, so as to provide a user with additional insights into their data that they may not have previously inquired into or considered relevant. In this way the system remains adapted to the individual user's needs, though also provides the user with additional investigations worth performing.

If the system is unable to understand the user at all, the system provides a choice to the user to "train for my input". User can then train the system to execute the right command. The user specifies some common English phrases related to how they will ask the question and then specifies the desired command to execute on the desired platform. The user may tag parameters in the question and those parameters may be processed and passed on to the target platform as the command's arguments. The user may then share this training with their team, and everyone can benefit from that new way to interact with the system using natural language.

In more detail, the system implements domain knowledge with natural language processing to achieve the desired results. Domain knowledge, as contemplated by the present disclosure, may include the user workflows, configurations, and constraints relevant to each third-party platform 108. The natural language processor 300 of the system converts the entities and intents of the user's input into the command-line instructions 302 of each unique third-party platform 108 by applying such domain knowledge.

If a user input comprises conditional language, such as "if," "then," "else," "for," "while," or "loop," along with a domain-specific command by commanding the system to, for example, "for each locked employee account, notify their boss," the system may translate and perform the following sequence of steps:

Step 1: condition, action, and repetition pattern detection "<for-each> <condition1> <action1>"

Step 2: condition1 construction "account status=locked"

Step 3: action1 construction "notify <boss>"

Step 4: resolve join field from condition1 to be "employee"

Step 5: resolve join field from action1 to be "boss"

Step 6: query employee table to find out boss

Step 7: repeat for every valid condition1

Once an input has been received, translated, and understood by the system the cloud-based IRIS API 102 may execute or facilitate the input. If, for example, the user input comprises commands related to analyzing the user's security data or logs, the cloud-based IRIS API 102 may interface with the user's SIEM software 108 to retrieve the requested information and present it to the user via the web-based user interface 100. The SIEM software 108 may refer to any one STEM software 108 known in the art, or may comprise multiple SIEM software 108 installed in the user's IT network, and the system may query data from the single or multiple SIEM software 108 and return the results in a single, uniform display via the web-based user interface 100. In this way, a user may view, visualize, and interact with data from multiple SIEM software 108 seamlessly, and without worrying from which source the data was retrieved.

If for example, the user input comprises a request for general information the cloud-based IRIS API 102 may interface with a remote data source 104, such as Google, to retrieve the requested information and present it to the user via the web-based user interface 100. An example of such an interaction would be "Search online for which port SSH runs on", to which the system would provide an answer based upon Google search results and also provide a reference link to the source webpage.

Figure 5:
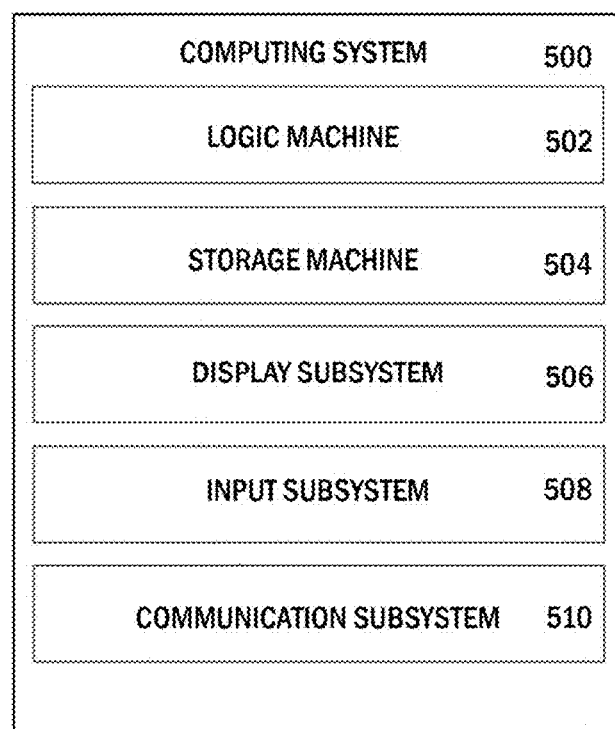
FIG. 5 schematically presents a computing system configured to carry out and actualize methods and tasks described herein, as contemplated by the present disclosure.

The illustration of FIG. 5 schematically presents a computing system that may represent an embodiment of the present invention. In some embodiments the method is executed on a computing system such as computing system 500 of FIG. 5. For example, storage machine 504 may hold instructions executable by logic machine 502 to provide the method to users.

Display subsystem 506 may display the various elements of the method to participants. For example, display subsystem 506, storage machine 504, and logic machine 502 may be integrated such that the method may be executed while being displayed on a display screen. The input subsystem 508 may receive user input from participants to indicate the various choices or user inputs described above.

The described method may be executed, provided or implemented to a user on one or more computing devices via a computer-program product such as via an application programming interface (API). FIG. 5 schematically shows a non-limiting exemplary embodiment of a computing system 500 that can enact the method described above. Computing system 500 may be any appropriate computing device such as a personal computer, tablet computing device, gaming device or console, mobile computing device, etc. Computing system 500 includes a logic machine 502 and a storage machine 504. Computing system 500 may include a display subsystem 506, input subsystem 508, and communication subsystem 510.

Logic machine 502 may execute machine-readable instructions via one or more physical devices. For example, the logic machine 502 may be configured to execute instructions to perform tasks for a computer program. The logic machine may include one or more processors to execute machine-readable instructions.

Storage machine 504 includes one or more physical devices configured to hold or store instructions executable by the logic machine to implement the method. When such methods and processes are implemented, the state of storage machine 504 may be changed to hold different data. For example, storage machine 504 may include memory devices such as various hard disk drives or CD or DVD devices.

Display subsystem 506 may visually present data stored on storage machine 504. For example, display subsystem 506 may visually present data to form a graphical user interface (GUI). Input subsystem 508 may be configured to connect and receive input from devices such as a mouse, keyboard, or gaming controller. Communication subsystem 510 may be configured to enable system 500 to communicate with other computing devices. Communication subsystem 510 may include wired and/or wireless communication devices to facilitate networked communication.

Figure 6:
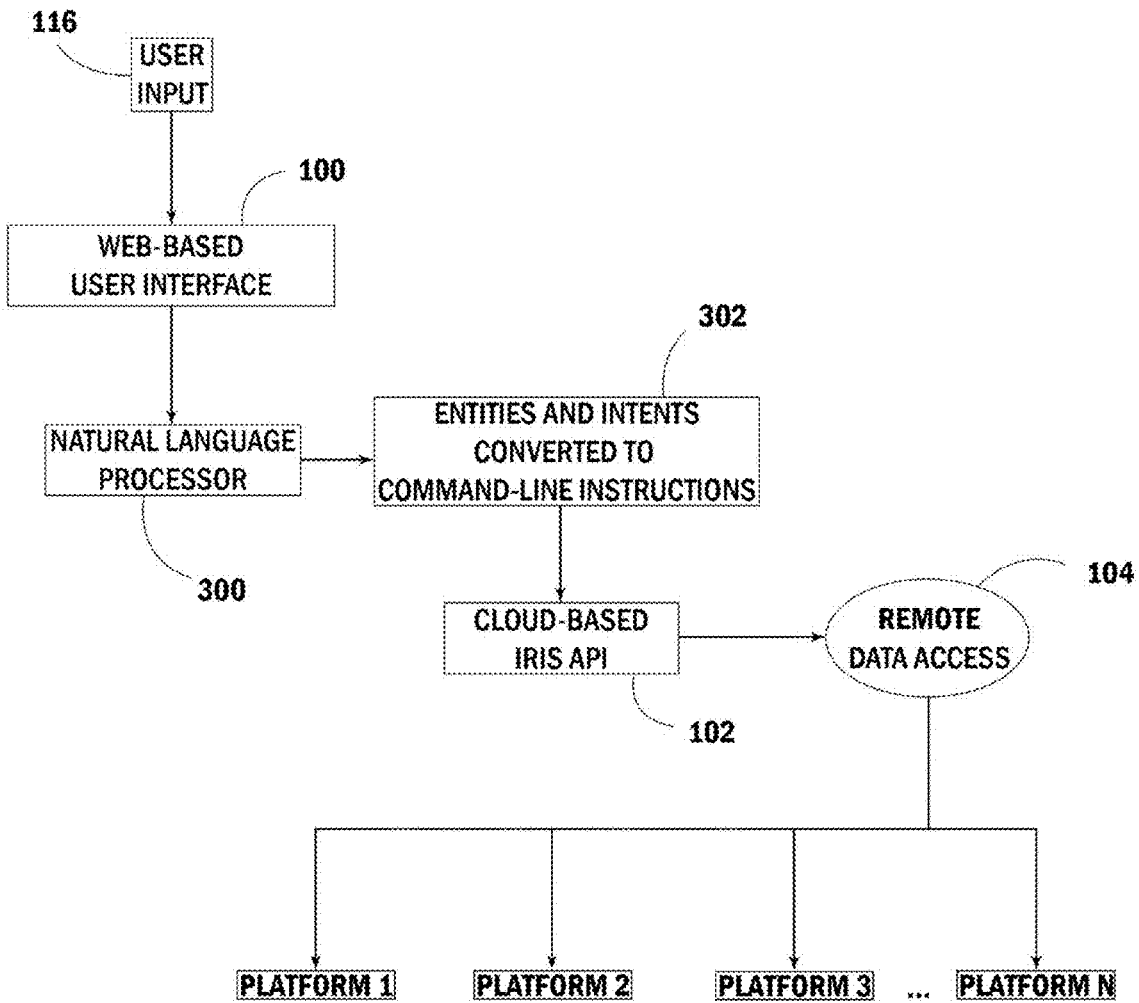
FIG. 6 schematically presents a virtual data lake system created with browser-based decentralized data access and analysis, as contemplated by the present disclosure.

The illustration of FIG. 6 schematically presents a virtual data lake system created with browser-based decentralized data access and analysis. The system may comprise an entirely browser-based web-based interface 100 accessible by a user through any internet or web browser known in the art. In this way the system does not require the installation of proprietary hardware or software onto a user's system, but otherwise allows the user to access the system.

The user may interact with the web-based user interface 100 by text-based input 110, voice-based input 112, or visual-based input 114 in a command-response manner emulating a conversation. The user may type queries and commands into the user interface 100 using any appropriate input source and may receive command results back from the third-party platforms where these commands are executed using the APIs of that specific external platform. The various inputs issued by the user may be for the purpose of executing commands, or taking actions, or making a configuration change, or querying data from the third-party platforms. The user may enter the direct platform command to be executed as is, or may provide an English sentence which would be first interpreted by the system's natural language processing engine. The virtual data lake system may then translate into the platform-specific command and then execute it on the appropriate third-party platform. The interaction between the browser and the third-party system for this command execution may be known as a "command-and-control channel."

The innovation running in the browser is designed to not send any sensitive information to the shared multi-tenant cloud-based IRIS service. The innovation running in the browser encodes any sensitive personally identifiable information (PII) present in the user's questions before sending it to the cloud-based IRIS service for translation. The encoded value in the translated platform command sent back by the cloud-based IRIS service is then decoded in the browser before the command is passed on for further execution on the target third-party platform. For achieving connectivity between the browser and the third-party platform, the user's administrator may store that platform's connection configuration in the cloud service but the more sensitive credentials such as connection passwords are not stored in the cloud. The user is instead prompted for those credentials and those credentials are saved on the local browser's storage.

When the third-party platform connectivity is needed, the connection configuration loaded from the cloud is combined with the credentials stored in the local browser, to create the connection described as the "command and control channel" above. Upon obtaining any query results gathered from various remote data storage platforms, those results are showed to the user on the browser but the cloud-based IRIS service itself is unable to access that data. In such an embodiment the user's web-based interface 100 may comprise a method for encoding and decoding data and credentials between itself and the cloud-based IRIS service, and ensuring the privacy of credentials between itself and the third-party data platform. By such a mechanism, this system of securing the virtual data lake system even from itself may be known as "privacy by design."

To begin using the system a user may first log into the web-based user interface 100 and provide a user input 116, which may be a selection of a remote data storage platform and an issuance of commands in natural language form to access or analyze data on that platform. The system may utilize its natural language processor 300 to convert the commands into relevant structured commands 302 recognized by the selected remote data storage platform. The system may then access the remote data platform, execute the analysis or commands instructed, and then return the results of the instructions to the user as a compiled display of results. The user may then input 116 additional commands or swap between platforms and use the results of the previous instructions to conduct further analyses on data stored remotely in a second location.

By way of example, the system may receive a plurality of command inputs from a user and return search results based on the input and the selected software platform and return data analyses that the user may then continue with on a second software platform. By way of example, the user may perform the following sequence of steps:

Step 1: Switch platform to splunk
Step 2: show me data from o365 index
Step 3: search 1 month ago to now
Step 4: show me data where recordtype equals 47 or recordtype equals 28
Step 5: remember ClientIP into <compromised_host>
Step 6: switch platform to elastic search
Step 7: start over
Step 8: show me all data where source_ip equals <compromised_host.clientip>
Step 9: switch platform to virustotal
Step 10: show file report of 10676cf66244cfa91567fbc1a937f4cb19438338b35b69d4

Because the analytical and investigational processes of the virtual data lake system created with browser-based decentralized data access and analysis aggregates and standardizes information stored across multiple remote locations in various languages, this operation may be known as a "federated search." The federated search feature of the system may run parallel or sequential searches, as desired, across the various remote software platforms programmed by the system's user. These searches may be run based on historical data contained within the remote systems, or may be run continuously in real-time such that the user is constantly presented with current and updating information. In this way the system may normalize data across multiple remote storage platforms and aggregate and analyze that data without moving it from the remote location. An example of normalization would be that when a federated parallel search brings results with one platform's tabular results having column "app_name" and another platform's tabular results having column "application_name", the system automatically determines that these fields represent the same information and hence they are merged to be presented in the same normalized column called "application".

The virtual data lake system may further comprise a user or team collaboration system, which may allow a single user or a team of users to share information, search data, and analyses results amongst one another. Many enterprises have teams of specialists dedicated to specific tasks, such as security teams, IT helpdesk teams, and management teams, and these various individuals or groups may need to share data analysis information with each other quickly and efficiently. These various types of extracted and shared results may be known collectively as an "Interest List."

Figure 7:
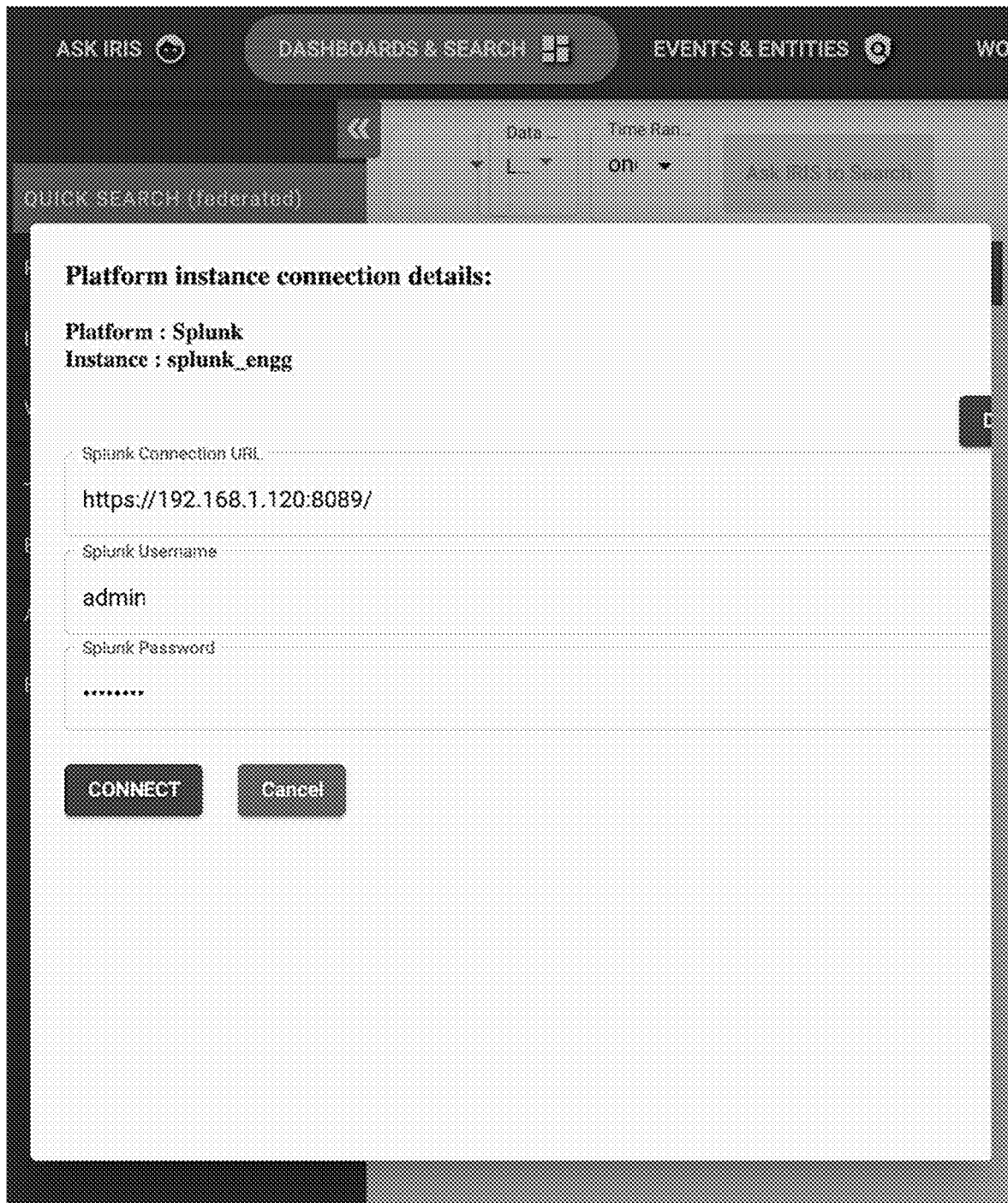
FIG. 7 illustrates an exemplary user login screen of a virtual data lake system created with browser-based decentralized data access and analysis, as contemplated by the present disclosure.

The illustration of FIG. 7 illustrates an exemplary user login screen of a virtual data lake system created with browser-based decentralized data access and analysis. A user of the system may begin by first selecting the data platform upon which their system is based, which may be any SIEM software or other appropriate third-party platform. The selection of the data platform allows the IRIS API to select the appropriate translational protocols for sending instructions to and receiving data from the SIEM software. The user may then enter the local area address of their data platform server so that the IRIS API knows where to send and receive the user's instructions and data. The user may finally enter a username and password to access their profile within the system, which may grant them access to any data for which they are authorized.

The illustration of FIG. 8 illustrates an exemplary platform instances interface of a virtual data lake system created with browser-based decentralized data access and analysis. In one embodiment a user may navigate to a section of the system where they may enter instances of multiple data platforms that the system may search through and source data from simultaneously or in sequence. The system may store the remote area address of the multiple platforms so that a user may quickly switch between these platforms to retrieve or analyze data. A user may, by way of example, retrieve analyses data from a first platform and then switch to a subsequent platform and use the first retrieved data to perform a secondary analysis.

Figure 9:
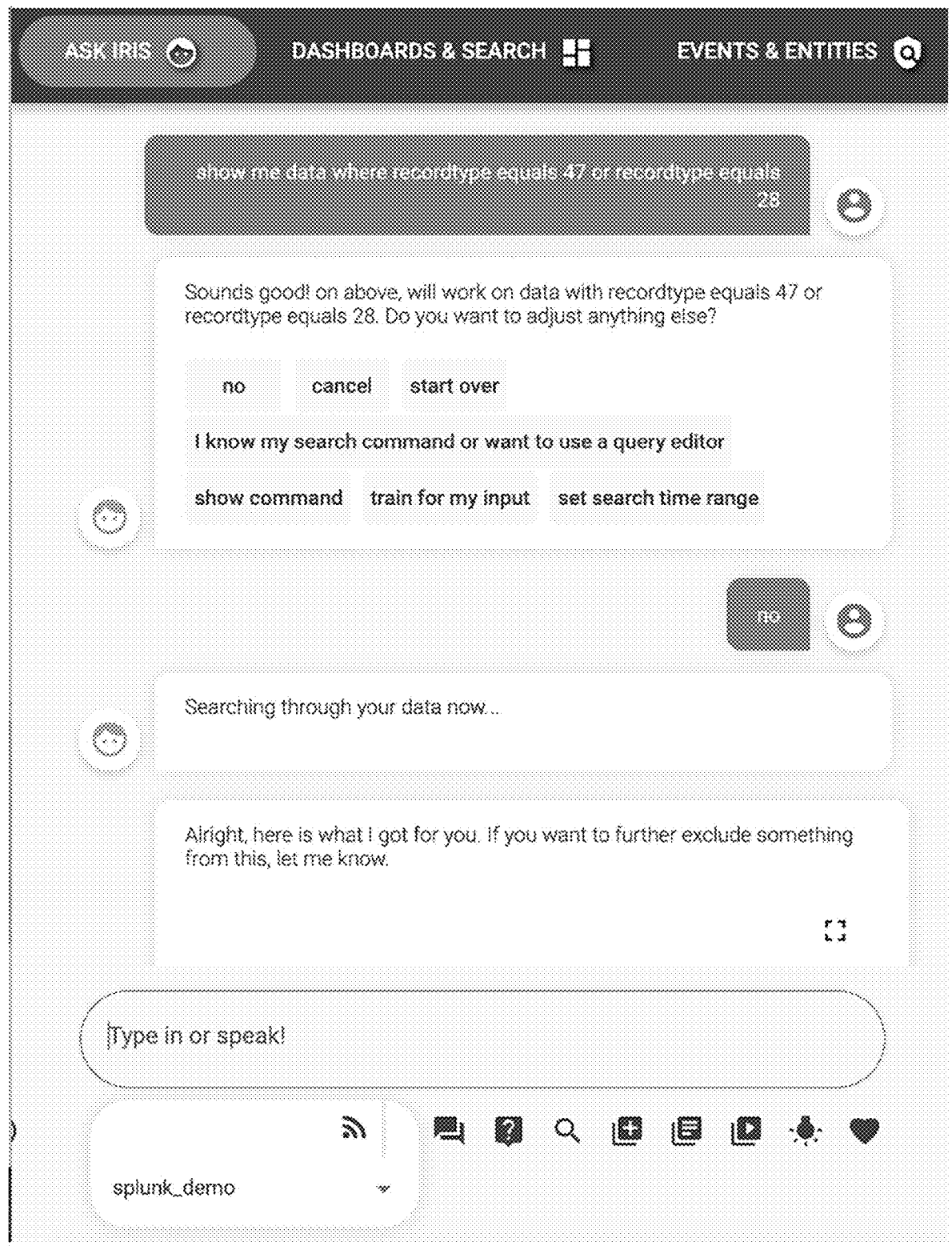
FIG. 9 illustrates an interactive interface of a virtual data lake system created with browser-based decentralized data access and analysis, as contemplated by the present disclosure.
Figure 10:
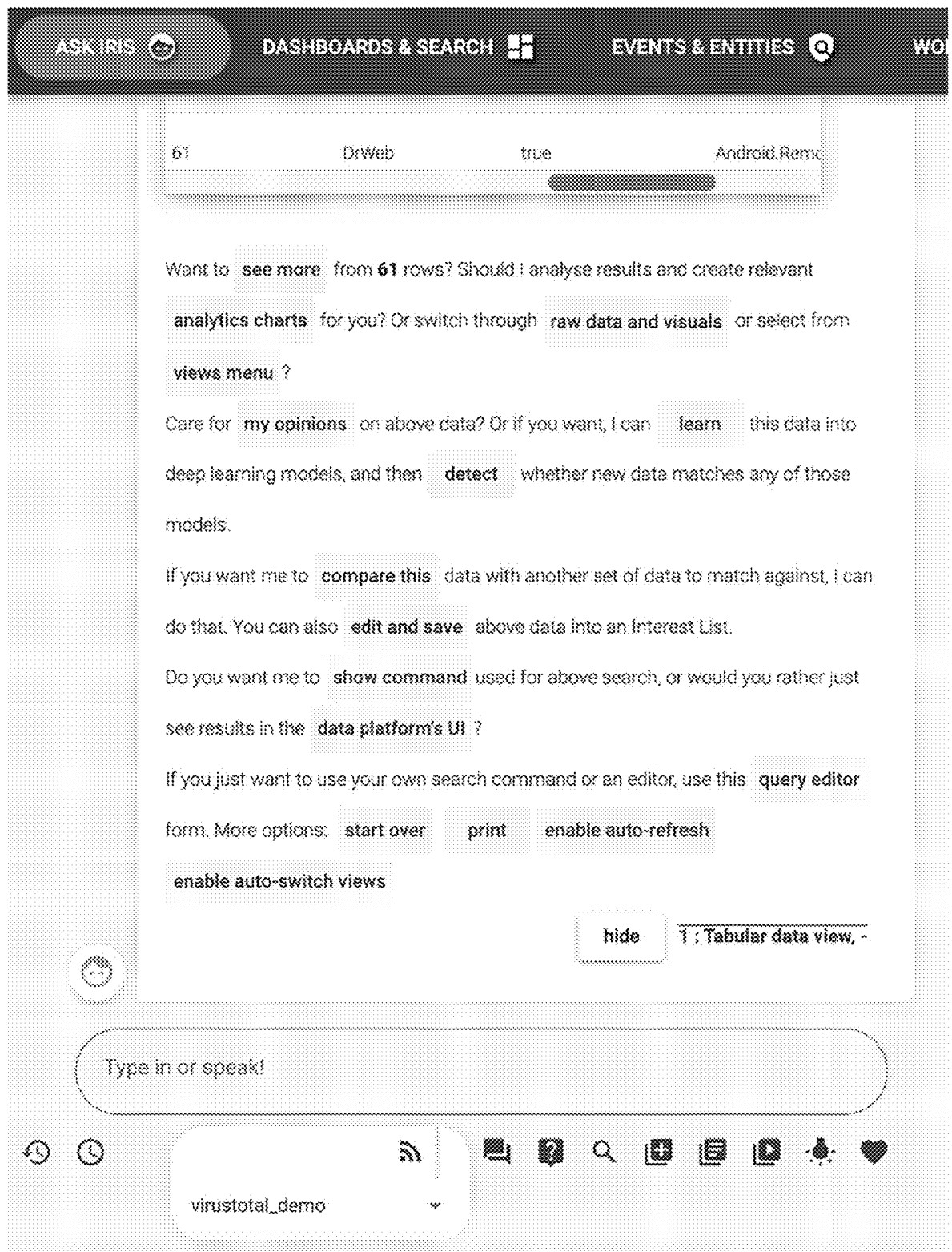
FIG. 10 illustrates an interactive interface of a virtual data lake system created with browser-based decentralized data access and analysis, as contemplated by the present disclosure.
Figure 11:
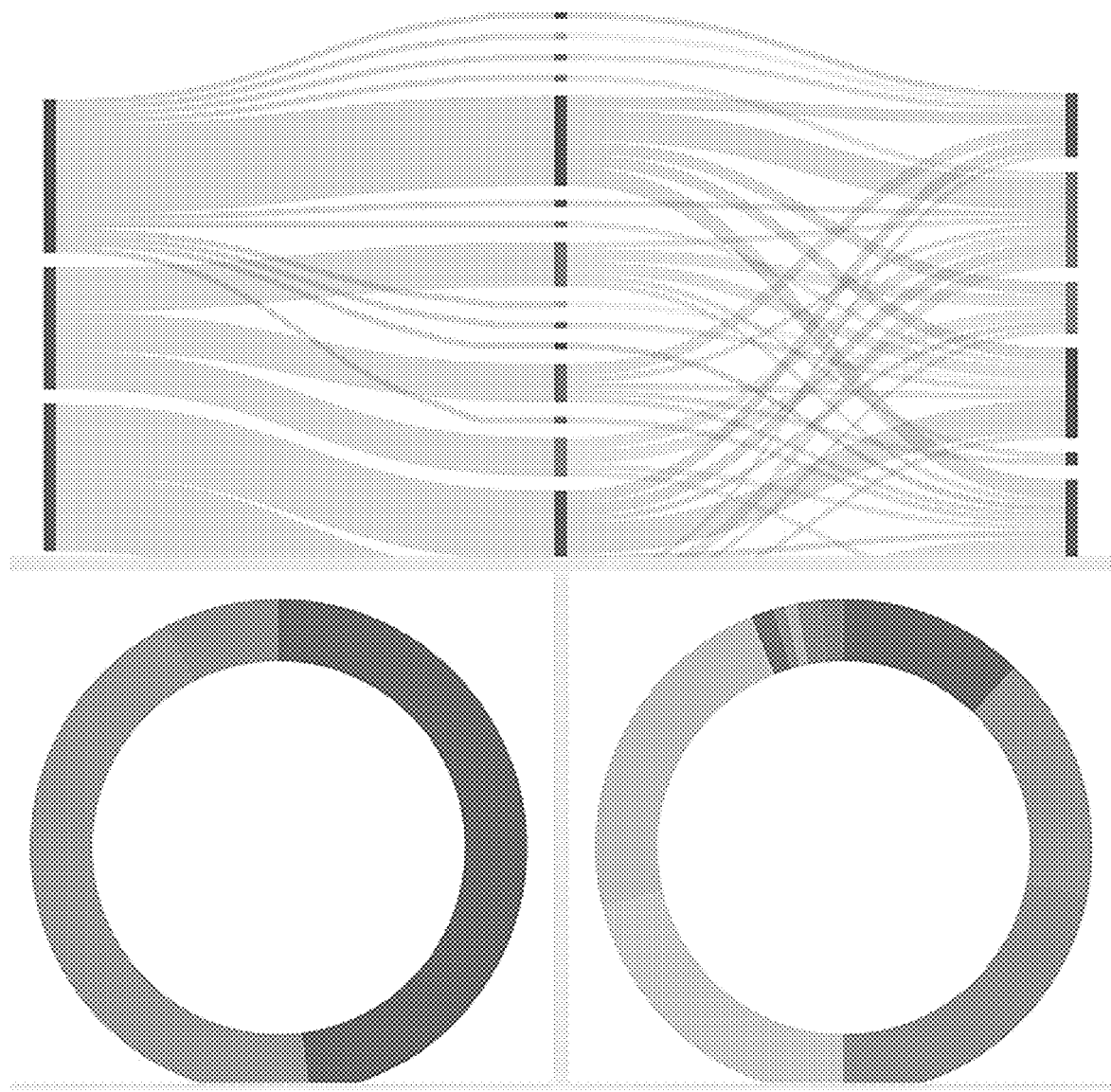
FIG. 11 illustrates an exemplary visualized output of a virtual data lake system created with browser-based decentralized data access and analysis, as contemplated by the present disclosure.

The illustrations of FIGS. 9-11 illustrate an exemplary web-based user interface of a virtual data lake system created with browser-based decentralized data access and analysis. Once the user has logged-into the system, the user may begin by entering instructions in the user interface, whether by text, voice, or visual input. The IRIS API may display inquiries and results within the user interface, and may further display entered text or transcribed voice or visual inputs in sequence to resemble a conversational progression. The format of the display output may be directed, as desired, by the system user, and the IRIS API may create visual or graphical output displays based on user parameters. The format of the display output may also be directed by the system, and the IRIS API may create visual or graphical output displays based on the optimal format for displaying such an output, which may be known as "data-driven visualization."

Figure 12:
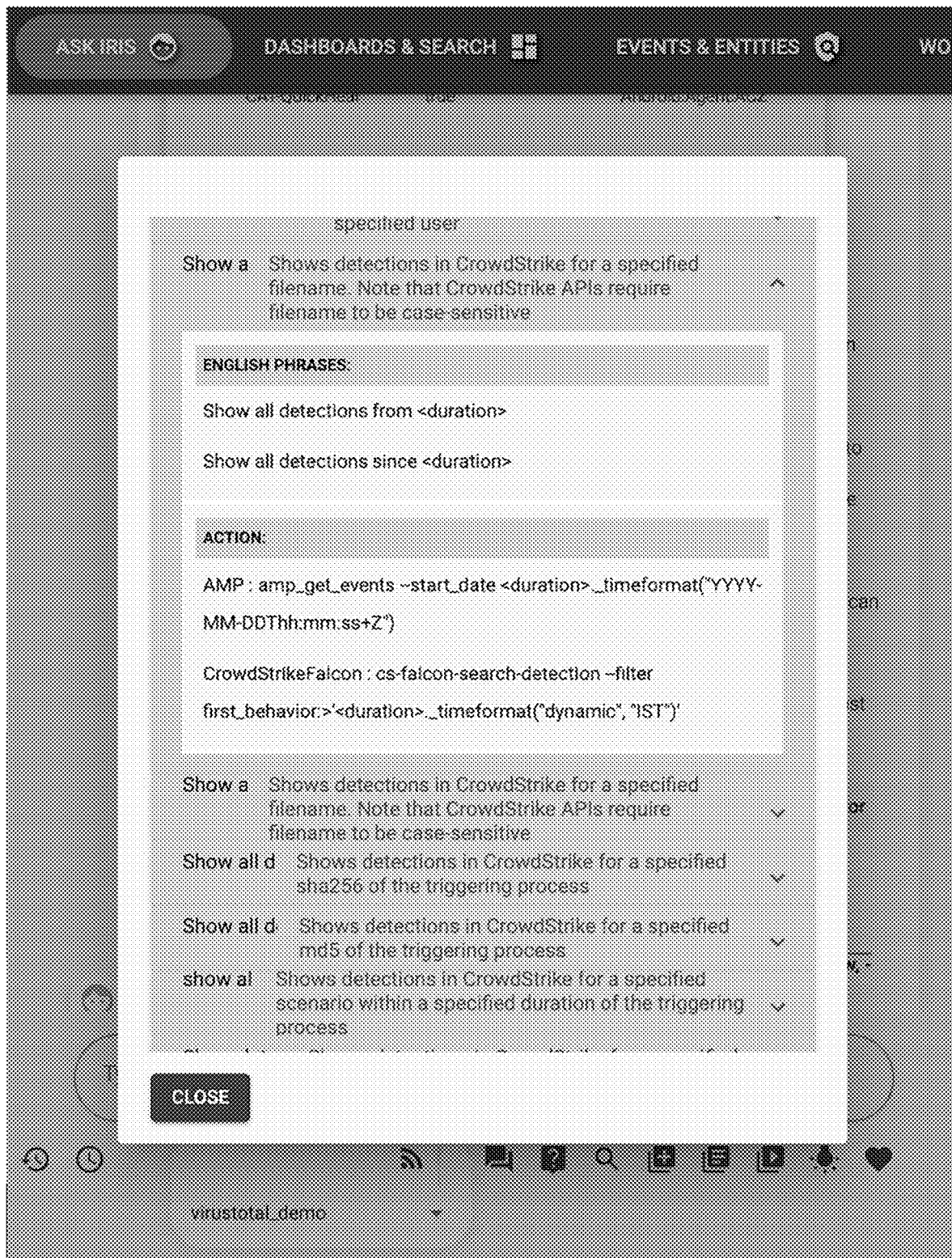
FIG. 12 illustrates a user and system training interface of a virtual data lake system created with browser-based decentralized data access and analysis, as contemplated by the present disclosure.

The illustration of FIG. 12 illustrates an exemplary workflow interface of a virtual data lake system created with browser-based decentralized data access and analysis. Workflows may be loaded by the user via the web-based user interface, and may be stored on the system's cloud-based IRIS service's central database. Workflows may be programmed by any user of the system, whether manually by the user or automatically by the system recording the user's input sequences, and made available to other users, and may be further correlated with specific IT security purposes or instructional sequences. Workflows, when shared by a user, may be further associated with the authoring user's data, such as name and experience, and the workflow platform may further incorporate a rating and comment system for user quality control purposes.

Figure 13:
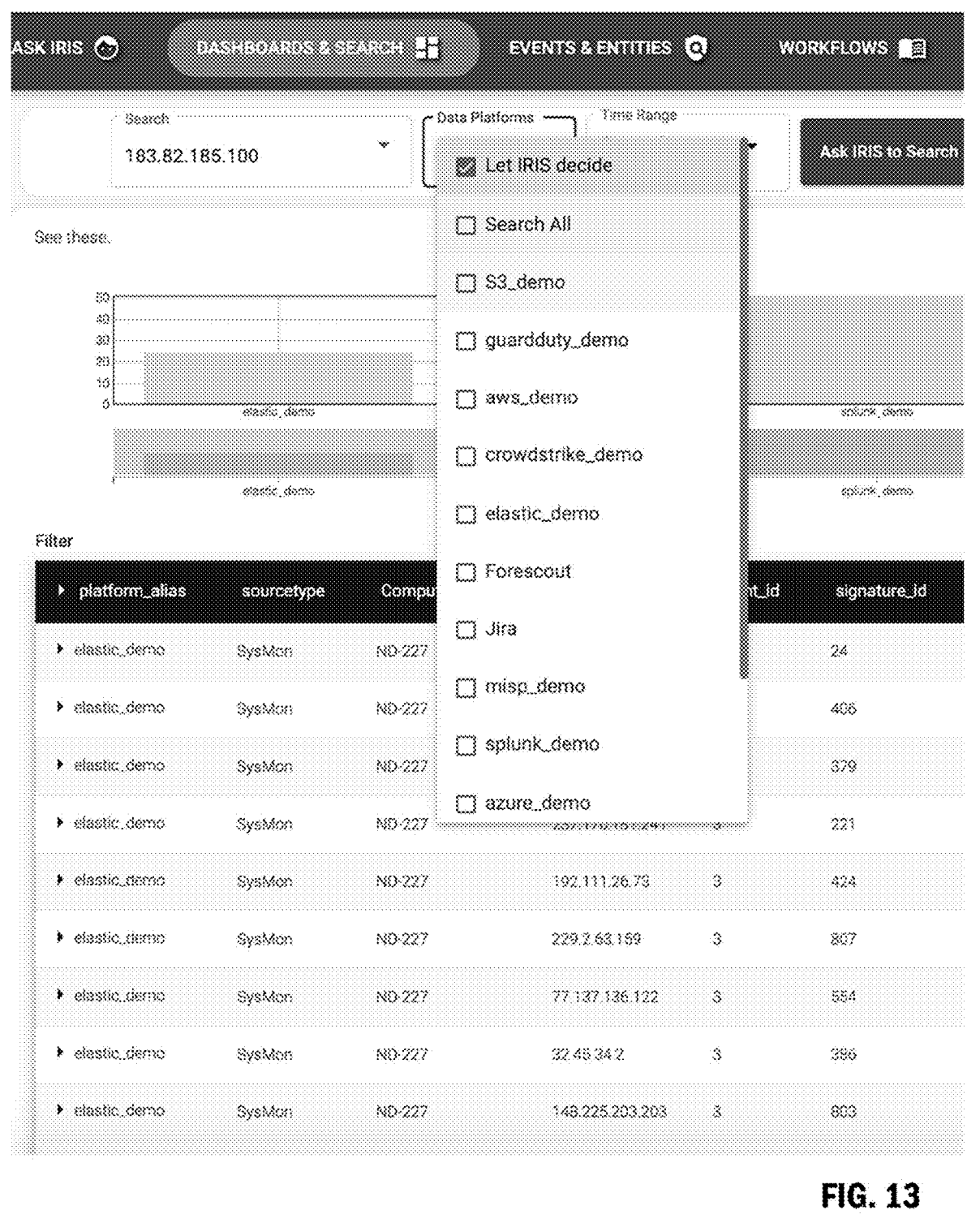

The illustration of FIG. 13 illustrates a federated dashboard interface of a virtual data lake system created with browser-based decentralized data access and analysis. Because the analytical and investigational processes of the virtual data lake system created with browser-based decentralized data access and analysis aggregates and standardizes various types of enterprise information stored across multiple third-party platforms, into panels of informative visuals created from the merged data from multiple platforms, this feature may be known as a "federated dashboard." The types of data recorded by an enterprise may vary significantly in scope and purpose such as, for example, employee information, device information, application information, and other types of information. The virtual data lake system may be able to extract, aggregate, and analyze these various types of information, regardless of where and in what format it is stored, and present the results of such aggregation and analysis in a uniform output. These various types of extracted IT objects may be known collectively as "monitored objects."

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

We claim:
1. A virtual data lake system, comprising:
a cloud service;
a proprietary software;
a natural language processor;
a plurality of workflows;
a user interface;
a cloud hosted application along with central configuration database;
wherein said proprietary software is installed on said cloud hosted application along with central configuration database;
wherein said user interface is a web-based interface between a user and said proprietary software;
wherein said proprietary software is pushed from said cloud service to be run on said user interface;
wherein said user interface obfuscates a plurality of customer-confidential data elements before communicating with said cloud service;
wherein said plurality of customer-confidential data elements comprises a plurality of customer-confidential data elements and personally identifiable information;
wherein said proprietary software is granted access by said user to a remote data storage platform;
wherein said user interface prompts said user for a first input;
wherein said user interface receives said first input from said user;
wherein said first input is converted into a remote platform-specific command by said proprietary software;
wherein said remote platform-specific command is in a command language understood by said remote data storage platform;
wherein said remote platform-specific command and said plurality of customer-confidential data elements are issued to said remote data storage platform;
wherein said remote data storage platform returns an initial result to said proprietary software;
wherein said initial result is converted to a first output by said proprietary software; and
wherein said first output is displayed to said user via said user interface.

2. The system of claim 1,
wherein said cloud service further comprises said natural language processor;
wherein said user interface prompts said user for a first natural language input;
wherein said user interface receives said first natural language input from said user;
wherein said first natural language input is converted into a remote platform-specific command by said natural language processor of said proprietary software;
wherein said remote platform-specific command is in a command language understood by said remote data storage platform;
wherein said remote platform-specific command is issued to said remote data storage platform;
wherein said remote data storage platform returns said initial result to said proprietary software;
wherein said initial result is converted to said first output by said proprietary software; and wherein said first output is displayed to said user via said user interface.

3. The system of claim 2,
wherein said user interface displays said first output and then prompts said user for a subsequent input;
wherein said subsequent input is converted to said remote platform-specific command and issued to said remote data storage platform;
wherein said remote data storage platform returns said initial result that is converted to a subsequent output and displayed to said user;
wherein said prompting for said subsequent input by said user interface is repeated until said user performs a stop action;
wherein said first input and each of said subsequent inputs are recorded in the order received by said proprietary software as a sequence of commands; and
wherein said sequence of commands is stored by said proprietary software as a unique workflow.

4. The system of claim 3;
wherein said user interface receives said first input from said user;
wherein said first input is a multiple command input;
wherein said multiple command input is converted into a sequence of remote platform-specific commands by said proprietary software;
wherein a first of said sequence of remote platform-specific commands is issued to said remote data storage platform;
wherein a next of said sequence of remote platform-specific commands is issued to said remote data storage platform until all commands in said sequence of remote platform-specific commands have been issued;
wherein said remote data storage platform returns said initial result to said proprietary software;
wherein said initial result is converted to said first output by said proprietary software;
wherein said first output is displayed to said user via said user interface; and
wherein said multiple command input is stored by said proprietary software as a unique workflow.

5. The system of claim 4,
wherein said user interface receives said natural language input from said user;
wherein said natural language input is said multiple command input;
wherein said multiple command input is converted into a sequence of remote platform-specific commands by said natural language processor of said proprietary software;
wherein said first of said sequence of remote platform-specific commands is issued to said remote data storage platform;
wherein said next of said sequence of remote platform-specific commands is issued to said remote data storage platform until all commands in said sequence of remote platform-specific commands have been issued;
wherein said remote data storage platform returns said initial result to said proprietary software;
wherein said initial result is converted to said first output by said proprietary software;
wherein said first output is displayed to said user via said user interface; and
wherein said multiple command input is stored by said proprietary software as a unique workflow.

6. The system of claim 5,
wherein said user instructs said user interface to recall and execute one of said unique workflows;
wherein said sequence of commands of said unique workflow is executed by said proprietary software to generate a progression output; and
wherein said progression output is displayed to said user via said user interface.

7. The system of claim 6,
wherein said proprietary software continuously issues said remote platform-specific command to said remote data storage platform;
wherein said remote data storage platform continuously returns an updated result to said proprietary software;
wherein said proprietary software continuously compares said initial result against said updated result to check for an updated output; and
wherein said updated output is displayed to said user via said user interface.

8. The system of claim 7,
wherein said first output, said progression output, and said updated output comprise a visualized output;
wherein said visualized output is created dynamically by said proprietary service; and
wherein said visualized output is displayed to said user via said user interface.

9. The system of claim 8,
wherein said proprietary software detects an open-ended input;
wherein said proprietary software extrapolates a plurality of queries from said open-ended input;
wherein said proprietary software presents said plurality of queries to said user;
wherein said user provides a feedback to said proprietary software; and
wherein said proprietary software adapts a plurality of future inquiries based on said feedback.

10. The system of claim 9,
wherein said federated visualized output is presented on a federated dashboard;
wherein said federated dashboard comprises a plurality of data categories; and
wherein said first output, said progression output, and said updated output are normalized and merged before being displayed to said user via said user interface.

11. A virtual data lake system, comprising:
a proprietary software;
a natural language processor;
a plurality of workflows;
a user interface;
a cloud hosted application along with central configuration database;
wherein said proprietary software is installed on said cloud hosted application along with central configuration database;
wherein said user interface is a web-based interface between a user and said proprietary software;
wherein said user interface obfuscates a plurality of customer-confidential data elements before communicating with said cloud service;
wherein said plurality of customer-confidential data elements comprises a plurality of customer-confidential data elements and personally identifiable information;
wherein said proprietary software is granted access by said user to a plurality of remote data storage platforms;
wherein said user interface prompts said user for a first input;

wherein said user interface receives said first input from said user;

wherein said first input is converted into a plurality of remote platform-specific commands by said proprietary software;

wherein one each of said plurality of remote platform-specific commands is in a command language understood by one each of said plurality of remote data storage platforms based on which of said remote data storage platforms contains a data set relevant to each of said plurality of remote platform-specific commands;

wherein one each of said plurality of remote platform-specific commands and said plurality of customer-confidential data elements are issued to one each of said plurality of remote data storage platforms based on which of said remote data storage platforms contains said data set relevant to each of said plurality of remote platform-specific commands;

wherein said plurality of remote data storage platforms return a collection of initial results to said proprietary software;

wherein said collection of initial results is converted to a first federated output by said proprietary software; and wherein said first federated output is displayed to said user via said user interface.

12. The system of claim 11, wherein said cloud service further comprises said natural language processor;

wherein said user interface prompts said user for a first natural language input;

wherein said user interface receives said first natural language input from said user;

wherein said first natural language input is converted into a plurality of remote platform-specific commands by said natural language processor of said proprietary software;

wherein one each of said plurality of remote platform-specific commands is in a command language understood by one each of said plurality of remote data storage platforms based on which of said remote data storage platforms contains a data set relevant to each of said plurality of remote platform-specific commands;

wherein one each of said plurality of remote platform-specific commands is issued to one each of said plurality of remote data storage platforms based on which of said remote data storage platforms contains a data set relevant to each of said plurality of remote platform-specific commands;

wherein said plurality of remote data storage platforms return said collection of initial results to said proprietary software;

wherein said collection of initial results is converted to said first federated output by said proprietary software; and wherein said first federated output is displayed to said user via said user interface.

13. The system of claim 12, wherein said user interface displays said first federated output and then prompts said user for a subsequent input;

wherein said subsequent input is converted to said remote platform-specific command and issued to said remote data storage platform;

wherein said remote data storage platform returns said initial result that is converted to a subsequent federated output and displayed to said user;

wherein said prompting for said subsequent input by said user interface is repeated until said user performs a stop action;

wherein said first input and each of said subsequent inputs are recorded in the order received by said proprietary software as a sequence of commands; and wherein said sequence of commands is stored by said proprietary software as a unique workflow.

14. The system of claim 13;

wherein said user interface receives said first input from said user;

wherein said first input is a multiple command input;

wherein said multiple command input is converted into a sequence of remote platform-specific commands by said proprietary software;

wherein a first of said sequence of remote platform-specific commands is issued to one each of said plurality of remote data storage platforms based on which of said remote data storage platforms contains said data set relevant to said first of said sequence of remote platform-specific commands;

wherein a next of said sequence of remote platform-specific commands is issued to one each of said plurality of remote data storage platforms based on which of said remote data storage platforms contains said data set relevant to said next of said sequence of remote platform-specific commands until all commands in said sequence of remote platform-specific commands have been issued;

wherein said plurality of remote data storage platforms return said collection of initial results to said proprietary software;

wherein said collection of initial results is converted to said first federated output by said proprietary software;

wherein said first federated output is displayed to said user via said user interface; and wherein said multiple command input is stored by said proprietary software as a unique workflow.

15. The system of claim 14, wherein said user interface receives said natural language input from said user;

wherein said natural language input is said multiple command input;

wherein said multiple command input is converted into a sequence of remote platform-specific commands by said natural language processor of said proprietary software;

wherein a first of said sequence of remote platform-specific commands is issued to one each of said plurality of remote data storage platforms based on which of said remote data storage platforms contains said data set relevant to said first of said sequence of remote platform-specific commands;

wherein a next of said sequence of remote platform-specific commands is issued to one each of said plurality of remote data storage platforms based on which of said remote data storage platforms contains said data set relevant to said next of said sequence of remote platform-specific commands until all commands in said sequence of remote platform-specific commands have been issued;

wherein said plurality of remote data storage platforms return said collection of initial results to said proprietary software;

wherein said collection of initial results is converted to said first federated output by said proprietary software;

wherein said first federated output is displayed to said user via said user interface; and wherein said multiple command input is stored by said proprietary software as a unique workflow.

16. The system of claim 15, wherein said user instructs said user interface to recall and execute one of said collective workflows;

wherein said sequence of commands of said collective workflows is executed by said proprietary software to generate a collective progression output; and wherein said collective progression output is displayed to said user via said user interface.

17. The system of claim 16, wherein one each of said plurality of remote platform-specific commands is continuously issued to one each of said plurality of remote data storage platforms based on which of said remote data storage platforms contains said data set relevant to each of said plurality of remote platform-specific commands;

wherein said plurality of remote data storage platforms continuously return a collection of updated results to said proprietary software;

wherein said proprietary software continuously compares said collection of initial results against said collection of updated results to check for an updated federated output; and wherein said updated federated output is displayed to user via said user interface.

18. The system of claim 17, wherein said first federated output, said collective progression output, and said updated federated output comprise a federated visualized output;

wherein said federated visualized output is created dynamically by said proprietary service; and wherein said federated visualized output is displayed to said user via said user interface.

19. The system of claim 18, wherein said proprietary software detects an open-ended input;

wherein said proprietary software extrapolates a plurality of queries from said open-ended input;

wherein said proprietary software presents said plurality of queries to said user;

wherein said user provides a feedback to said proprietary software; and wherein said proprietary software adapts a plurality of future inquiries based on said feedback.

20. The system of claim 19, wherein said federated visualized output is presented on a federated dashboard;

wherein said federated dashboard comprises a plurality of data categories; and wherein said first federated output, said collective progression output, and said updated federated output are normalized and merged before being displayed to said user via said user interface.

\* \* \* \* \*